(12) United States Patent
Beuker

(10) Patent No.: US 6,996,177 B1
(45) Date of Patent: Feb. 7, 2006

(54) MOTION ESTIMATION

(75) Inventor: Rob A. Beuker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1103 days.

(21) Appl. No.: 09/624,522

(22) Filed: Jul. 24, 2000

(30) Foreign Application Priority Data

Aug. 22, 1999 (EP) ................................. 99202532

(51) Int. Cl.
*H04B 1/66* (2006.01)
*H04N 7/36* (2006.01)
*G06T 7/20* (2006.01)

(52) U.S. Cl. .............................. 375/240.16
(58) Field of Classification Search ........... 375/240.15, 375/240.16; 348/845.1, 415.1, 416.1; 382/236; H04N 7/36; G06T 7/20; H04B 1/66
See application file for complete search history.

(56) References Cited

U.S. PATENT DOCUMENTS

| 5,473,379 | A | 12/1995 | Horne .................. 348/416 |
| 5,575,286 | A | 11/1996 | Weng et al. ............ 128/653.1 |
| 5,729,302 | A | 3/1998 | Yamauchi .............. 348/699 |
| 6,278,736 | B1 * | 8/2001 | De Haan et al. ........ 375/240.16 |
| 6,385,245 | B1 * | 5/2002 | De Haan et al. ........ 375/240.16 |
| 6,462,791 | B1 * | 10/2002 | Zhu ..................... 348/845.1 |

FOREIGN PATENT DOCUMENTS

| DE | 4112235 | 11/1992 |
| EP | 0652678 A2 | 5/1995 |
| EP | 0652678 A3 | 5/1995 |
| EP | 0897247 | 2/1999 |
| WO | WO9746922 | 12/1997 |

OTHER PUBLICATIONS

"Real-Time 2-3 Pull-Down Elimination Applying Motion Estimation/Compensation in a Programmable Device" by R.J. Schutten and G. de Haan, in IEEE Transactions on Consumer Electronics, vol. 44, No. 3, Aug. 1998.

* cited by examiner

*Primary Examiner*—Tung Vo
(74) *Attorney, Agent, or Firm*—Edward W. Goodman

(57) ABSTRACT

In a motion vector estimation method, a block-based motion vector estimation process (BME) that involves comparing a plurality of candidate vectors is carried out to determine block-based motion vectors, at least a most frequently occurring block-based motion vector (MFMV) is determined, a global motion vector estimation process (GME) using at least the most frequently occurring block-based motion vector (MFMV) is carried out to obtain a global motion vector (GMV), and the global motion vector (GMV) is applied as a candidate vector to the block-based motion vector estimation process (BME).

8 Claims, 1 Drawing Sheet

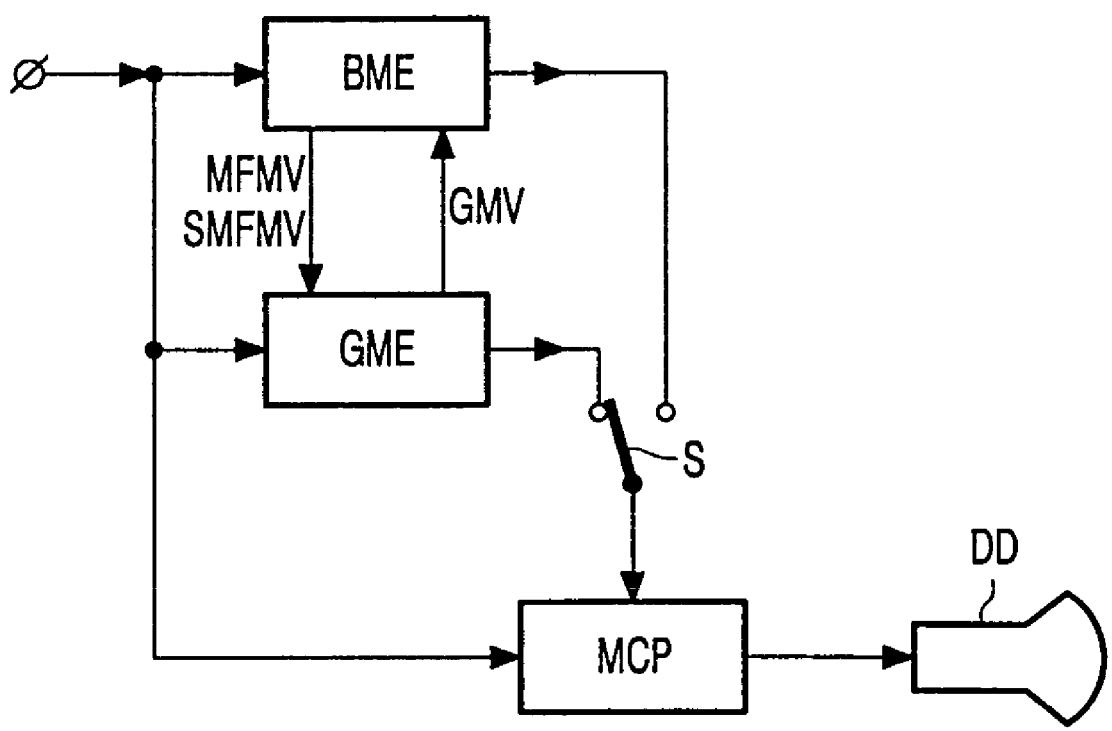

US 6,996,177 B1

MOTION ESTIMATION

BACKGROUND OF THE INVENTION

1. Field of the Invention

The invention relates to a method and device for motion estimation, a motion-compensated picture signal processing device comprising such a motion estimation device, and a picture display apparatus comprising such a motion-compensated picture signal processing device.

2. Description of the Related Art

A prior art motion estimation technique, called "3-D Recursive Search", has been described by Gerard de Haan and Robert Jan Schutten, "Real-time 2–3 pull-down elimination applying motion estimation/compensation in a programmable device", IEEE Transactions on Consumer Electronics, Vol. 44, No. 3, August 1988, pp. 930–938. 3-D Recursive Search falls in the class of pixel- or block-recursive motion estimators. The algorithm is based in the following assumptions: motion does not change much in time, i.e., from frame to frame. The algorithm maintains a motion field and tries to update this field only when necessary. The motion field is usually similar for a relatively large region, i.e., for an object. Therefore the motion vectors in the neighborhood of a location are good candidates for the motion in that location. Video consists of a sequence of frames. Each frame is divided into blocks, e.g., of 16×16 pixels. A motion vector is associated with each block. The motion vector should hold the displacement between the block in the current frame compared to the previous frame. Suppose that we want to update the motion vector of block (x,y) in the current frame. 3-D Recursive Search uses only a limited number of candidate vectors, say five, for the estimation, viz. some vectors from the previous frame, i.e.) temporal vectors, some vectors from the current frame, i.e., spatial vectors, and an update of a spatial vector. For each candidate the motion estimation error is calculated. The candidate with the lowest motion estimation error is chosen as the best motion vector for that block. The algorithm uses the normal raster scan order to go through the blocks.

International Patent Application No. WO-A-97/46,022, corresponding to U.S. patent application Ser. No. 08/863, 700, filed May 27, 1997, discloses a method of estimating motion vectors, in which motion parameters are determined for a given field of a video signal, and motion vectors for a subsequent field of the video signal are determined in dependence upon at least one predetermined motion vector (i.e., a motion vector already estimated for a spatio-temporally neighboring block) and at least one additional motion vector derived from the motion parameters. The motion parameters for the given field may be derived from motion vectors determined for the given field, e.g., by applying a two-dimensional histogram operation on the motion vectors determined for the given field.

European Patent Application EP-A-0,652,678, corresponding to U.S. Pat. No. 5,473,379, discloses a method and apparatus for improving a block-based motion compensation in digital video coding. The location of the search window within a reference frame is defined using the global motion of the frame. In one embodiment, the global motion vector is generated utilizing the motion vector occurring with the most repetition within a plurality of previously stored motion vectors.

SUMMARY OF THE INVENTION

It is, inter alia, an object of the invention to provide an improved motion estimation technique. To this end, the invention provides a motion estimation method and device, a motion-compensated picture signal processing apparatus, and a picture display apparatus.

In a motion vector estimation method in accordance with a primary aspect of the present invention, a block-based motion vector estimation process that involves comparing a plurality of candidate vectors, is carried out to determine block-based motion vectors, at least a most frequently occurring block-based motion vector is determined, a global motion vector estimation process using at least the most frequently occurring block-based motion vector is carried out to obtain a global motion vector, and the global motion vector is applied as a candidate vector to the block-based motion vector estimation process.

These and other aspects of the invention will be apparent from and elucidated with reference to the embodiments described hereinafter.

BRIEF DESCRIPTION OF THE DRAWINGS

The drawing shows a functional block diagram of an embodiment of a motion-compensated picture display apparatus in accordance with the present invention.

DESCRIPTION OF THE PREFERRED EMBODIMENT

When using 3-D Recursive Search for global motion estimation, we have as a main task: how to obtain one motion vector from all the motion vectors? Our approach is based on the following steps:

1. The global motion vector is defined as the most used motion vector in appropriate blocks. We also use the second-most used motion vector. A block is appropriate if the motion estimation error is small enough and the block contains enough detail.
2. Make the motion field smooth by introducing a global motion vector candidate.

In fact, we use two motion estimators, a normal motion estimator that is using the global motion vector, and a global motion estimator. First we will describe how we extract a global motion from the motion field. We will describe the properties of each motion estimator in the next sections. Finally, it is described how both motion fields are used to build the global motion estimator.

Why do we need two motion vectors? We use the normal motion estimator to track the changes. From the associated motion field we cannot obtain the correct global motion, but only candidate global motion vectors. We use a global motion estimator, still using the 3-D Recursive Search concept, for selecting the best global motion vector. We cannot solely use this global motion estimator because it is not capable of tracking changes.

The global motion is extracted from the motion field in two steps: count, for all "appropriate" blocks, the number of times that a motion vector is used, and obtain from these count, the most and second-most used motion vectors.

A block is "appropriate" if the motion estimation error is small enough (average SAD smaller than 30), and the block contains enough activity (activity larger than 50) where the activity per block is defined as: activity=$\max_{(i,j)}(y(i,j)) - \min_{(i,j)}(y(i,j))$. We remove the blocks with a low activity, because the motion estimation is not reliable for blocks without detail. Currently, we use the Sum-of-Absolute-Difference measure (SAD) for the displacement error. Let $y[i,j]$ and $y_{prev}[i,j]$ denote the pixel values of the current frame and previous frame, respectively. The Sum-of-Absolute-Difference measure is calculated by:

$$SAD = \sum_{(i,j)} |y(i,j) - y_{prev}(i+MV_x, j+MV_y)|,$$

where $(MV_x, MV_y)$ is the candidate motion vector and the summation is over the block. The SAD is set to "0" if it is smaller than a threshold to remove the influence of fixed pattern noise.

We also use the second-most used motion vector to improve the robustness of the algorithm. We found that sometimes the algorithm will favor the zero-motion vector, whereas there is some camera panning. Supplying the global motion estimator with both vectors solves this situation.

The 3-D Recursive Search estimator uses the following 6 candidates:
1. The most-used global motion vector (which is also used as best global motion vector).
2. The spatial vector of block (x−1,y−1) (upper left).
3. The spatial vector of block (x+1,y−1) (upper right).
4. The temporal vector of the current block.
5. The temporal vector of block (x,y+1) (lower).
6. An update of the spatial vector of block (x−1, y−1) if x is even and of block (x+1,y−1) if x is odd.

The update is obtained as follows. The update vector is the sum of the spatial vector and a delta vector. The delta vector (dx, dy) is read from a list of 16 possible delta vectors. The list of sixteen possible delta vectors is given in the next table.

| j  | 0 | 1  | 2 | 3  | 4 | 5  | 6  | 7   | 8 | 9  | 10 | 11 | 12 | 13 | 14 | 15 |
|----|---|----|---|----|---|----|----|-----|---|----|----|----|----|----|----|----|
| dx | 0 | 0  | 0 | 0  | 4 | −4 | 12 | −12 | 0 | 0  | 1  | −1 | 0  | 0  | 2  | −2 |
| dy | 4 | −4 | 8 | −8 | 0 | 0  | 0  | 0   | 1 | −1 | 0  | 0  | 2  | −2 | 0  | 0  |

The table shows that the maximum update per vector is 12 pixels horizontally and 8 pixels vertically.

How do we select a delta vector? We simply use the next delta vector in the list for the next block and start with delta vector 0. Suppose that element j is used for block (x,y), then we use element j+1 for the next block (i.e. block (x+1,y)) and we use delta element "0" if j+1 equals sixteen.

Each candidate is checked to see whether the resulting address is valid, i.e., points to an area within the frame. If not, the vector is clipped to the nearest valid motion vector.

The next table shows the penalties for each vector type. Penalties are added to block matching errors (SAD) in order to favor certain candidate motion vectors over other candidate motion vectors in order to smoothen the motion field.

| Vector type | Penalty (per block) |
|---|---|
| Global motion vector | 3 |
| Spatial vector | 0 |
| Temporal vector current block | 0 |
| Temporal vector lower block | 8 |
| Update vector | 32 |

The global motion estimator uses the following four candidates:
1. Most-used motion vector obtained by the block-based 3-D Recursive Search estimator.
2. Second-most used motion vector obtained by the block-based 3-D Recursive Search estimator.
3. Cyclically varying updates of the motion vector mentioned at 1 (see above).
4. Cyclically varying updates of the motion vector mentioned at 2 (see above).

On a block basis, the global estimator determines which of the four candidates is the best one. From these best candidates determined on a block basis, the most-frequently occurring one is retained.

The penalties for each type are:

| Vector type | Penalty (per block) |
|---|---|
| Motion vector | 0 or 1 |
| Update of motion vector | 32 |

The penalty for the global motion candidate is 1 if the motion vector is zero and 0 otherwise. This may be simplified to "0" only without losing accuracy.

The full motion estimator in accordance with the present invention uses the following steps per frame:
1. Get the best global motion vector from the global motion estimation OME.
2. Use this vector for the 6-candidate 3-D Recursive Search motion estimation BMB.
3. Extract the most used and second-most used global motion vectors from the resulting motion field.
4. Use these motion vectors in the global motion estimation GME, i.e. in the four-candidate motion estimation.
5. The global motion is extracted from the resulting motion field and used in step To reduce the CPU load of the algorithm, the number of motion estimation blocks is reduced by sub-sampling. Since we only require one motion vector per frame, the global motion vector, we do not need to calculate a motion vector for each block, so that the number of used blocks can be sub-sampled. We currently use a sub-sampling factor of two horizontally and two vertically. Note that we may be able to use a factor of four for the global motion estimation, if necessary. The sub-sampling factor is limited for the following reasons: A too high sub-sampling factor reduces the probability that there are "appropriate candidates" (blocks with a small motion estimation error and a sufficiently high activity). Moreover, using too few blocks will reduce the smoothness of the motion field. In addition, it is possible to apply sub-sampling within a block to reduce the number of pixels.

Using processor-specific features, such as MMX, also helps in speeding up the computation. Also, the time spend in the SAD calculation can in principle be reduced by using cross correlation.

To improve the global motion estimation algorithm, the following measures are possible. Retain not only the most used and second-most used global motion vectors, but also less frequently used motion vectors. Use only the central part of the current frame for motion estimation, e.g., a quarter of the frame. If there is some rotation (with the middle of the frame as center of rotation), the blocks in the outer area of the frame will contain more displacement than the central part. Note that this latter measure will also reduce the computational load.

The drawing shows a functional block diagram of an embodiment of a motion-compensated picture display apparatus in accordance with the present invention. A picture signal is applied to a block-based motion vector estimator BME and to a global motion-vector estimator GME that operate as set out above. The block-based motion vector estimator BME applies a most frequently used motion vector MFMV and a: second-most frequently used motion vector SMFMV to the global motion-vector estimator GME. The global motion-vector estimator GME applies a global motion vector GMV as a candidate vector to the block-based motion vector estimator BME. The picture signal is also applied to a motion-compensated processor MCP for carrying out, e.g., a motion-compensated interpolation (say, a 100 Hz conversion) or a motion-compensated stitching of images obtained by a scanner or video camera. The motion-compensated processor is controlled by either block-based motion vectors supplied by the block-based motion vector estimator BME or global motion vectors supplied by the global motion estimator GME. A switch S symbolically indicates this choice. In practice, depending on the application, there is no switch S and the appropriate type of motion vectors is used. Global vectors will e.g., be used for stitching scanned images, while block-based vectors will e.g., be used for 100 Hz conversion. The output of the motion-compensated processor MCP is applied to a display device DD. In other applications of the invention, such as in a scanner, the output of the motion-compensated processor MCP will be printed on paper.

It should be noted that the above-mentioned embodiments illustrate rather than limit the invention, and that those skilled in the art will be able to design many alternative embodiments without departing from the scope of the appended claims. Where in the above-described examples only a most-used and a second-most used vector are used, it is an obvious generalization clearly falling within the scope of the claims to use the N most-used vectors. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A motion vector estimation method, comprising the steps:
    carrying out a block-based motion vector estimation process that involves comparing a plurality of candidate vectors to determine block-based motion vectors;
    determining at least a most frequently occurring block-based motion vector;
    carrying out a global motion vector estimation process using at least the most frequently occurring block-based motion vector to obtain a global motion vector; and
    applying the global motion vector as a candidate vector to the block-based motion vector estimation process.

2. The method as claimed in claim 1, wherein the determining step includes:
    making a selection among block-based motion vectors having a corresponding motion error below a given motion error threshold.

3. The method as claimed in claim 1, wherein the determining step includes:
    making a selection among block-based motion vectors estimated for blocks having a difference between maximum and minimum pixel values above a given activity threshold.

4. The method as claimed in claim 1, wherein both the most frequently occurring block-based motion vector and a second-most frequently occurring block-based motion vector are determined and used in the global motion vector estimation process.

5. The method as claimed in claim 1, wherein said global motion vector estimation process includes the steps:
    comparing, on a block basis, a plurality of candidate vectors, including the most frequently occurring block-based motion vector, to obtain best vectors determined per block; and
    outputting a most-frequently occurring best vector determined per block as the global motion vector.

6. A motion vector estimation device, comprising:
    block-based motion vector estimation means for determining block-based motion vectors based on a comparison of a plurality of candidate vectors;
    means for determining at least a most frequently occurring block-based motion vector;
    means for carrying out a global motion vector estimation process using at least the most frequently occurring block-based motion vector to obtain a global motion vector; and
    means for applying the global motion vector as a candidate vector to the block-based motion vector estimation means.

7. A motion-compensated picture signal processing apparatus, comprising:
    a motion vector estimation device as claimed in claim 6 for generating motion vectors; and
    a motion-compensated processor for processing a picture signal in dependence on the motion vectors.

8. A picture display apparatus, comprising:
    a motion-compensated picture signal processing apparatus as claimed in claim 7 to obtain a processed picture signal; and
    a display device for displaying the processed picture signal.

* * * * *